United States Patent
Neuhaus et al.

(10) Patent No.: US 7,609,663 B2
(45) Date of Patent: Oct. 27, 2009

(54) METHOD FOR ESTABLISHING A COMMUNICATION CONNECTION IN A DIRECT COMMUNICATION NETWORK

(75) Inventors: Ralf Neuhaus, Lünen (DE); Rainer Uecker, Mülheim (DE)

(73) Assignee: Siemens Aktiengesellschaft, Munich (DE)

( * ) Notice: Subject to any disclaimer, the term of this patent is extended or adjusted under 35 U.S.C. 154(b) by 601 days.

(21) Appl. No.: 10/573,676

(22) PCT Filed: Aug. 13, 2004

(86) PCT No.: PCT/EP2004/009108
§ 371 (c)(1),
(2), (4) Date: Mar. 24, 2006

(87) PCT Pub. No.: WO2005/041535
PCT Pub. Date: May 6, 2005

(65) Prior Publication Data
US 2007/0005720 A1   Jan. 4, 2007

(30) Foreign Application Priority Data
Sep. 26, 2003   (DE) ................ 103 45 051

(51) Int. Cl.
*H04H 20/71* (2008.01)
*H04L 12/28* (2006.01)
*H04M 3/32* (2006.01)
*G06F 15/167* (2006.01)

(52) U.S. Cl. ............... 370/312; 370/420; 370/432; 379/211.01; 379/212.01; 379/215.01; 455/417; 455/456.1; 709/212; 709/228

(58) Field of Classification Search ........... 370/420, 370/312, 432; 455/417, 456.1, 456.2, 463; 709/206, 212, 217, 227–228, 230–231, 239, 709/245; 379/211.01, 211.02, 212.01, 215.01, 379/221.01
See application file for complete search history.

(56) References Cited

U.S. PATENT DOCUMENTS 5,093,827 A * 3/1992 Franklin et al. ............. 370/354
(Continued)

FOREIGN PATENT DOCUMENTS

EP   1014660 A2   6/2000

OTHER PUBLICATIONS

International Telecommunication Union; ITU-T Recommendation H.450.3, Series H: Audiovisual and Multimedia Systems, Supplementary service for multimedia—Call diversion supplementary service for H.323; S. 1-60; Book; 1998.
Comsoc; Korpi, M. u.a.: Supplementary Services in the H.323 IP Telephony Network (online); S. 118-125 (recherchiert am 04.05.04) im Internet : URLhttp://www.comsoc.org/-ci/private/1999/jul/pdf/Korpi.pdf>; Others; 1999.

(Continued)

*Primary Examiner*—Aung S Moe
*Assistant Examiner*—Benjamin Elliott

(57) ABSTRACT

A method for establishing a communication connection between two subscribers of a plurality of subscribers in a direct communication network is provided. Subscriber address information required for establishing paired communication connections between the subscribers is stored in the plurality of subscribers in a distributed manner; a searching subscriber sends a broadcast request message aimed at the establishment of at least one communication connection between a calling subscriber and at least one sought subscriber; each subscriber receiving the broadcast request message sends a response message containing subscriber address information required for the at least one communication connection, provided that the emission of a response message is associated therewith according to the respective functionality thereof; and said subscriber address information is then used to establish the communication connection between the calling subscriber and the at least one sought subscriber.

16 Claims, 4 Drawing Sheets

U.S. PATENT DOCUMENTS

| | | | |
|---|---|---|---|
| 5,530,744 A * | 6/1996 | Charalambous et al. | 379/266.08 |
| 6,085,238 A * | 7/2000 | Yuasa et al. | 709/223 |
| 6,141,413 A * | 10/2000 | Waldner et al. | 379/88.17 |
| 6,144,671 A * | 11/2000 | Perinpanathan et al. | 370/409 |
| 6,269,099 B1 * | 7/2001 | Borella et al. | 370/389 |
| 6,463,146 B1 * | 10/2002 | Hartley et al. | 379/215.01 |
| 6,487,180 B1 * | 11/2002 | Borgstahl et al. | 370/310 |
| 7,027,435 B2 * | 4/2006 | Bardehle | 370/352 |
| 2002/0086710 A1 * | 7/2002 | Humes | 455/564 |
| 2002/0116464 A1 * | 8/2002 | Mak | 709/206 |
| 2002/0136182 A1 * | 9/2002 | Bardehle | 370/338 |
| 2002/0143944 A1 | 10/2002 | Traversat et al. | |
| 2002/0143989 A1 * | 10/2002 | Huitema et al. | 709/243 |
| 2003/0095546 A1 * | 5/2003 | Sakano et al. | 370/352 |

OTHER PUBLICATIONS

Siemens AG; I and C World, the Magazin for Information and Communications; www.siemens.com /icworld; Magazine; 2003.

ITU-T Recommendation H.323 (Nov. 2000), Series H: Audiovisual and Multimedia Systems, Packet-based multimedia communications systems, International Telecommunication Union, © ITU 2002, Printed in Switzerland, Geneva, 2002, S. 1—242.

Michael S. Marmor; "Make the P2P Leap with Toadnode"; Web Techniques; Dec. 2000; vol. 5, No. 12; pp. 1-9; [Retrieved from Internet] Mar. 20, 2006; XP-008000376; ISSN: 1086-556X; Miller Freeman, US.

* cited by examiner

METHOD FOR ESTABLISHING A COMMUNICATION CONNECTION IN A DIRECT COMMUNICATION NETWORK

CROSS REFERENCE TO RELATED APPLICATIONS

This application is the US National Stage of International Application No. PCT/EP2004/009108, filed Aug. 13, 2004 and claims the benefit thereof. The International Application claims the benefits of German application No. 10345051.3 DE filed Sep. 26, 2003, both of the applications are incorporated by reference herein in their entirety.

FIELD OF INVENTION

The invention relates to a method for setting up a communication link between two clients from a plurality of clients in a directly communicating communication network.

BACKGROUND OF INVENTION

Communication networks whose components communicate with one another on a packet-switched basis are replacing circuit-switched communication networks to an increased extent. Such directly communicating networks are frequently also called Voice-Over-IP (VoIP) networks if the Internet protocol (IP protocol) is used for interchanging the audio information which is present in the form of data (voice data). In this case, the networks may be used either exclusively for transmitting voice data or else can transmit both voice data and other information (e.g. data, video) as a mixture.

In circuit-switched communication networks, terminals (e.g. telephones, fax machines) are always connected to a communication node (e.g. a telephone exchange). In this case, any flow of information to and from the terminals involves the respective communication node, with control information for setting up connections, for example, being interchanged between the terminal and the communication node while, although the useful information (the analog voice signal or the modulated fax signal) is interchanged between the terminals involved in the communication link, it is forwarded (transmitted) by at least one communication node involved in the communication link.

In voice data networks, the terminals are frequently called "clients", because the terminals in these communication networks are operated in a similar manner to a computer in a data network and may be in the form not only of a telephone or a fax machine, but also of a multimedia PC, for example. The latter terminals are computers which have suitable hardware for inputting information (e.g. a microphone, a camera, a keyboard, a scanner etc.) and outputting information (e.g. a screen/display, loudspeakers, LEDs etc.). Clients may also be in the form of a miniature PC (a "PDA"—Personal Digital Assistant) or in the form of an added-feature mobile telephone ("smart phone"). Said appliances are often equipped with a wireless data link and are then, in the case of mobile telephones, also called "WLAN mobile phones" (WLAN=Wireless Local Area Network).

The clients in the voice data networks usually interchange the useful information with one another directly. To this end, after a communication link has been set up, two clients communicating with one another respectively know the network address of their communication partner, and they use these network addresses to interchange the data packets containing the useful information with one another. To set up a connection, on the other hand, central network nodes (communication nodes) are also used in most known voice data networks. Such network nodes are known as "gatekeepers" to the voice data networks using the H.323 protocol (ITU-T-H.323) and as SIP proxy servers in the voice data networks using the SIP protocol (IETF-SIP; SIP=Session Initiation Protocol).

In widely ramified data networks, particularly on the Internet, communication structures called "Peer-to-Peer" networks or else "End-To-End" networks are increasingly being used. A primary area of application for such communication structures is the interchange of files, known as "filesharing". For this, a subscriber (client) in such a communication structure interrogates a number of other clients (typically computers) on the search for a particular resource (which may be a music file or a computer program) and, when this resource has been found, starts to use this resource, which usually involves the transmission ("download") of a file or a plurality of files. In this case, appropriate communication partners (clients) can either be found using a database, or else the clients can be found by appropriate communication methods automatically, i.e. without a central entity.

Some of the known "Peer-To-Peer" networks are used for the purposes of direct communication. The "media data", that is to say the useful data, interchanged in the process are not limited to voice (voice data) or modulated information (e.g. fax transmissions), but rather also include moving-picture information (video transmission, video conferencing, "multimedia messaging") and other forms of electronic communication too. In such communication networks, which are also called "directly communicating communication networks", it is thus firstly possible to implement communication links in the style of conventional "telephone calls", and it is secondly possible to transmit expanded contents (multimedia) too. In this case, dispensing with central network nodes (communication nodes) has the advantage of increased fail-safety, which has the associated drawback that the (switching) functionality of the network nodes known from circuit-switched telephony needs to be provided by the clients involved in the communication link themselves.

SUMMARY OF INVENTION

A particular drawback found with the known directly communicating communication networks is that a client needs to have the address information (e.g. the network address) for a second client in order to set up a communication link to the second client. This is a problem because the client does not normally have a directly associated network node (e.g. a communication server) from which such an address can be requested. Even if the address information for a required communication partner is known, it may occur in directly communicating communication networks that this required communication partner cannot be reached (e.g. if it is "busy" or if the client fails), which means that the connection needs to be set up to an alternative call destination ("alternate destination"), for example. Since directly communicating communication networks use no central network nodes for storing such address information, the problem of addressing also exists for connection setup to such an alternative call destination.

It is an object of the invention to propose a method which can be used to ascertain required address information for communication links in directly communicating communication networks.

First, client address information which is required for setting up paired communication links between the clients is stored in distributed form in the plurality of clients. A searching client then transmits a broadcast request message aimed at setting up at least one communication link between a calling client and at least one sought client. Subsequently, provided that the broadcast request message's respective functionality means that it has the transmission of a response message associated with it, which response message comprises a client address information item which is required for the at least one communication link, each client receiving the broadcast request message transmits this response message. Finally, this client address information item is used to set up the communication link between the calling client and the at least one sought client.

The method steps described above store the client address information required for setting up a communication link in one or more clients in the communication network. As a result of a plurality of request messages being sent, at least one of these further clients is prompted to send back the previously stored client address information to the searching clients. This means that setup of the communication link is not dependent on a single client on which a client address information item may be stored, but rather setup of a communication link may also be effected when individual clients are not available.

The method is advantageously refined by the characterizing features of dependent claims. In this case, features of the dependent claims may also be advantageously combined with one another.

The number of response messages returned is minimized by virtue of a receiving client's functionality including signaling the broadcast request message on the client and transmitting the response message when the broadcast is taken. This means that firstly signaling is performed only for such clients as receive the broadcast request message and obtain a positive result when evaluating this broadcast request message, and secondly a response message is transmitted only if the call is to be taken on the respective client.

If a call diversion in cases in which the signaling information sent from the calling client to a called client in order to set up a first communication link is rejected or not promptly answered by the called client is made by virtue of one of the stored client address information items in step a) relating to a call diversion destination client for the called client, the request message in step b) comprising an identifier for the called client, and the client address information item contained in the response message in step c) describing the call diversion destination client, then a call diversion destination can be stored in the communication network for a client without needing to reserve a central memory entity for this. In this case, it is advantageous if the searching client is formed by the calling client, because in such cases the calling client receives the response message with the client address information directly without a further intermediate entity and can set up the communication link to the call diversion destination without further delay. A call diversion destination can be configured particularly easily by virtue of a client storing the information that this client forms the call diversion destination for another client. Subsequently, the response message is sent by the sought client, which forms the call diversion destination client, which ensures particularly fast and safe setup of the communication link.

A call which is waiting on one client can be taken particularly easily on another client by virtue of a call made by the calling client to the searching client, which belongs to a call transfer group, being transferred by virtue of the client address information in step a) respectively describing the clients associated with the call transfer group.

If the broadcast request message in step b) is transmitted specifically to the further clients in the call transfer group which are described in the client address information, the number of clients addressed in the broadcast request message is advantageously reduced.

If the communication link in step b) is set up, when there are a plurality of sought clients transmitting the response message, to that sought client which transmitted the response message first, very rapid connection setup is achieved. Advantageously, in the course of the communication link being set up, a message is sent to the other clients in the call transfer group which are signaling this call, so that there is no longer any further signaling in this call, with response messages which arrive "late" being rejected.

The clients in the call transfer group which are signaling the call and are not being called directly are prevented from being blocked by virtue of the call signaling in step c) being effected such that the clients are in a free operating state during the call signaling. Advantageously, this call signaling differs from call signaling for a direct call in which the client is already in the "busy" state during call signaling.

A call can be signaled on a plurality of clients simultaneously by virtue of a group call being made by virtue of the client address information in step a) respectively describing the clients associated with the group, and the communication link in step d) being set up to that sought client transmitting the response message which transmitted the response message first. In this case, all called clients in the group are advantageously in the "busy" state during call signaling.

If the calling client in step c) forms the searching client, the group members to be called can be determined in the calling client directly.

If in step c) an order among the clients assigned to transmit a response message is stipulated in which the call signaling is effected on these clients in succession, it is possible to implement the known service feature of the "cyclic line group". In this case, it is either possible to stipulate an order such that the individual clients in the group are synchronized to one another for the purpose of stipulating the order, alternatively an order can be firmly prescribed, or finally this order can also be stipulated afresh with each new call.

By contrast, for setting up a communication link particularly rapidly, it is advantageous if in step c) the call signaling on the clients assigned to transmit a response message is effected simultaneously. The call can then be taken immediately on any affected terminal, with call acceptance on a plurality of clients advantageously involving the communication link being set up to that client on which call acceptance occurs first, or to that client which has the highest allocated priority.

A telephone book ("Directory") can be created particularly easily in a client if after step c) the client address information item contained in the response message is stored by the searching client in an address database associated with this searching client, and in step d) the address database is accessed in order to set up the communication link. Directories with a restricted number of subscribers can be generated by virtue of the broadcast request message in step b) comprising at least one filter criterion which is used for selecting particular clients, and the response message being transmitted in step c) provided that the respective client contains information which meets the at least one filter criterion and/or the respective client has properties which meet the at least one filter criterion.

A communication link which is parked on one of the clients in the communication network can easily be transferred by another client in the communication network by virtue of a communication link to the sought client, which is connected to a client used as a waiting destination with a waiting destination descriptor, being set up by virtue of the waiting destination descriptor being sent to the searching client before step b), the broadcast request message in step b) comprising the waiting destination descriptor, the client used as waiting destination transmitting the response message in step c), and the connection between the sought client and the client used as waiting destination being cleared down in step d). This means that any one of a plurality of clients which are available in the communication network and which can be used as a waiting destination can be used in order to park a communication link. The method steps described mean that the client used as a waiting destination and hence the parked communication link are found easily and safely without having to define a particular entity or a particular client in the communication network as a waiting destination permanently.

BRIEF DESCRIPTION OF THE DRAWINGS

Exemplary embodiments of the inventive method are explained below with reference to the drawings, in which.

DETAILED DESCRIPTION OF INVENTION

Figure 1A:
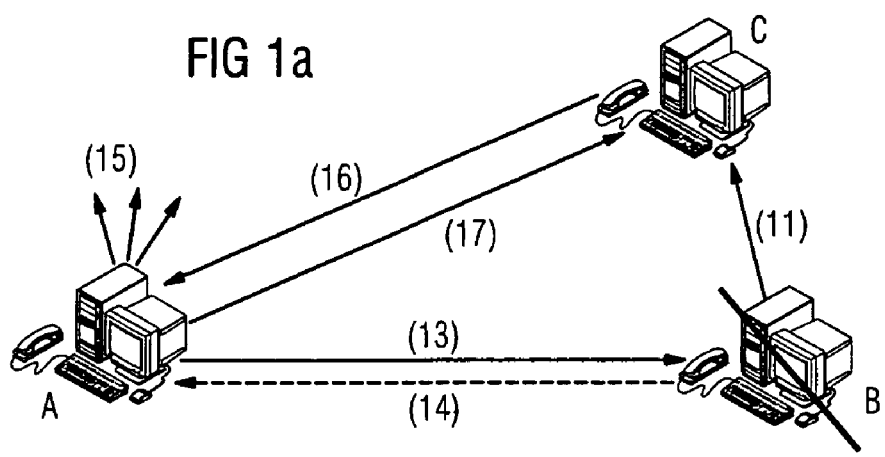
FIG. 1a shows the interchange of messages between clients in a directly communicating communication network for the purpose of call diversion in a first variant.

FIG. 1a shows the clients A, B, C, which are part of a directly communicating communication network (not shown here). The clients A, B, C are "multimedia PCs", that is to say computers which are connected to a network and which are set up to reproduce and accept audiovisual useful data. Instead of the multimedia PCs, it is also possible to use other network components which can be used as a communication terminal instead, for example IP telephones. The clients A, B, C can interchange control data (signaling information) and useful data with one another via the directly communicating communication network, which is in the form of a voice data network (VoIP communication network) and which interchanges data (voice data, useful data) in line with the Internet protocol (IP protocol; TCP-IP; UDP-IP).

The arrows shown in FIG. 1a and in the other figures visualize the transmission or interchange of messages between the clients which are used to set up a communication link. In this case, the arrows have been provided with reference symbols, which can be repeated in the individual figures, provided that the respective message or control information is a respective message with the same function. Similarly, the clients A, B, C and further clients are shown repeatedly in the figures, provided that their functionality is not changed between the individual figures. Neither the arrows with the same label nor the clients with the same label are described again when they are used repeatedly.

In the communication arrangement shown in FIG. 1a, the client C is intended to be the call diversion destination for the client B. To set up the call diversion, the user of the client B makes an input in which client C is defined as the call diversion destination. On the basis of this input, client B sends a control message 11 to client C, with this control message being taken as a basis for configuring client C as a call diversion destination client for client B (step A). In this case, the control message 11 comprises the descriptor and network address of client B as address information. This concludes the configuration of the call diversion.

Client B now changes to the "offline" operating state; that is to say that the multimedia PC, which forms client B, is from now on no longer able to be reached in the communication network.

To set up a communication link to client B, client A sends a control message 13 which is addressed to client B and which is intended to prompt call signaling on client B. Since client B can no longer be reached in the communication network, however, no response message is sent, which is registered by client A after a waiting time has elapsed ("timeout").

Alternatively, the case may also arise in which although client B is not "offline" it is not available for setting up the communication link for other reasons. In such cases, client B can receive the control message 13 and can respond to it using another control message 14 for rejecting the call, which means that client A is likewise informed about connection setup to client B not being possible.

To ascertain an alternative call destination for client B, which cannot be reached, client A sends a broadcast request message to all other clients which can be reached in the communication network (step B). Such a broadcast request message which is sent to all the clients which can be reached is also called a "broadcast message". Alternatively, such a broadcast request message can also be sent to a restricted number of the clients which can be reached, in which case it is called a "multicast message".

The search message 15 sent as a broadcast request message in the form of a "broadcast message" is received by all those clients which can be reached in the communication network, FIG. 1a showing client C by way of example. When the control message 11 was received, client C stored the address information of the call diversion destination for client B, it being the network address of client C itself which defines the call diversion destination for client B. When the search message 15 is received, which comprises the address information of client A as sender, client C establishes that this search message 15 relates to client C itself, and as a result client C sends a response message 16 to client A, which comprises the address information of client C as an indication of the call diversion destination (step c). In a similar manner to the control message 13 for setting up the communication link to client B, client A now sends a new control message 17 containing signaling information to client C, as a result of which the communication link between client A and client C is set up (step d).

Figure 1B:
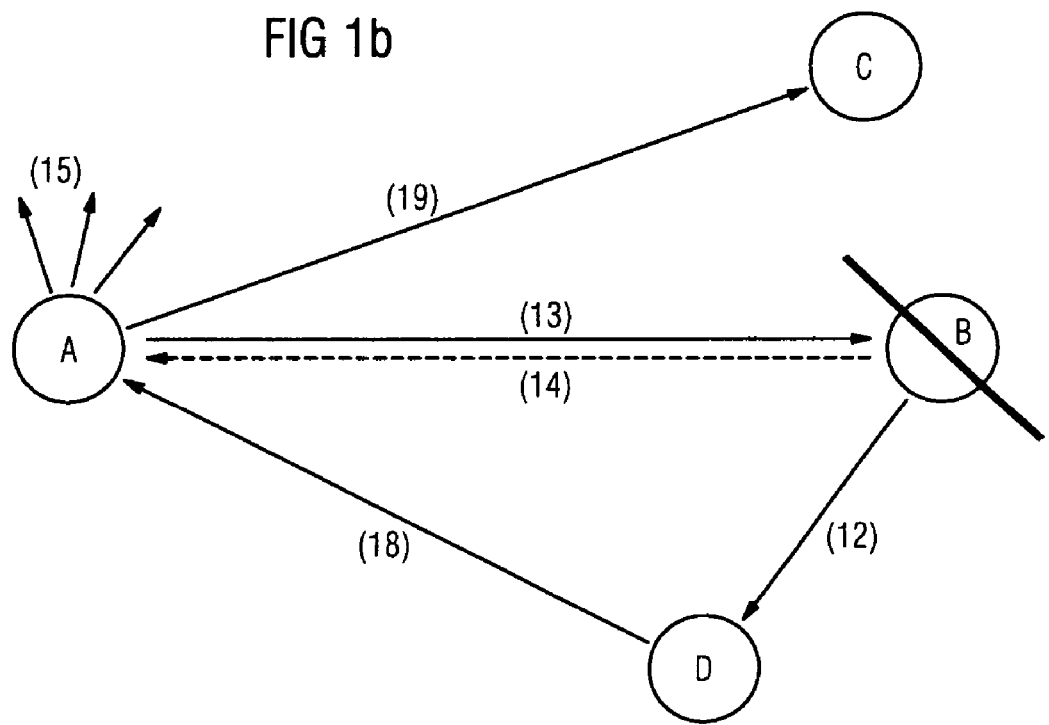
FIG. 1b shows the interchange of messages between clients for the purpose of call diversion in a second variant.

FIG. 1b shows a further exemplary embodiment of call diversion in a directly communicating communication network, where a further client D is shown for clients A, B, C from the preceding exemplary embodiment. Like clients A, B, C client D is also in the form of a multimedia PC in a technically similar manner. In this example too, client C is intended to form the call diversion destination for client B, but with client B not being able to set up a direct link to client C at the time at which the call diversion is configured. For this reason, client B sends a control message 12 (configuration message) to client D, this control message being used to transmit, as address information for the call diversion destination, the network address of client C and naturally, as information about the diverted call destination, the address information and the name of client B to client D (step a). When this configuration has taken place, client B is turned off.

To set up a communication link between client A and client B, client A sends a control message 13 to client B, requesting setup of the communication link. Since no response comes from client B within the defined waiting time (in this case too, a negative response 14 is alternatively possible), client A in turn sends a search message 15 to a plurality of clients (step b), this time as a "multicast message" to clients C and D arranged in the communication network. This search message 15 contains a definition that client A is looking for a substitute call destination for client B. It goes without saying that an address information item describing client A is also part of the search message 15. The search message 15 is received by clients C and D, client D containing a database entry which matches the search query 15. This is because in this case the match is established between client B defined in the search message 15 and the call diversion destination configured in the course of reception of the control message 12. Client B therefore now sends a response message 18 to client A, transmitting to client A the information that the call diversion destination for client B comprises the address information item associated with client C (step c). Client A now sends a control message 19 to client C (step d), this control message 19 using additional information held in the signaling information to express that this requested communication link is a communication link which is diverted for client B. Client C now signals an incoming call, with a display on the user interface revealing that this incoming call is a call which was originally addressed to client B.

Figure 2A:
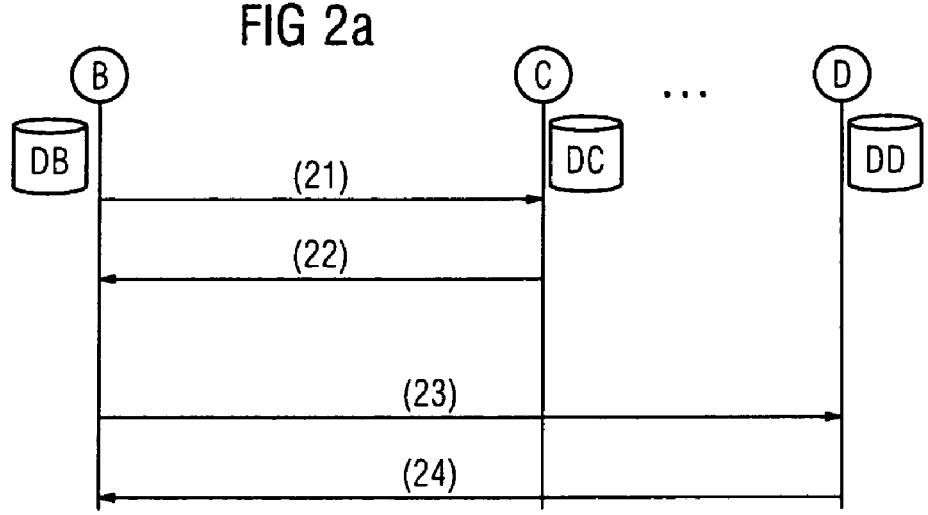
FIG. 2a shows the interchange of messages between clients in order to form a group.
Figure 2B:
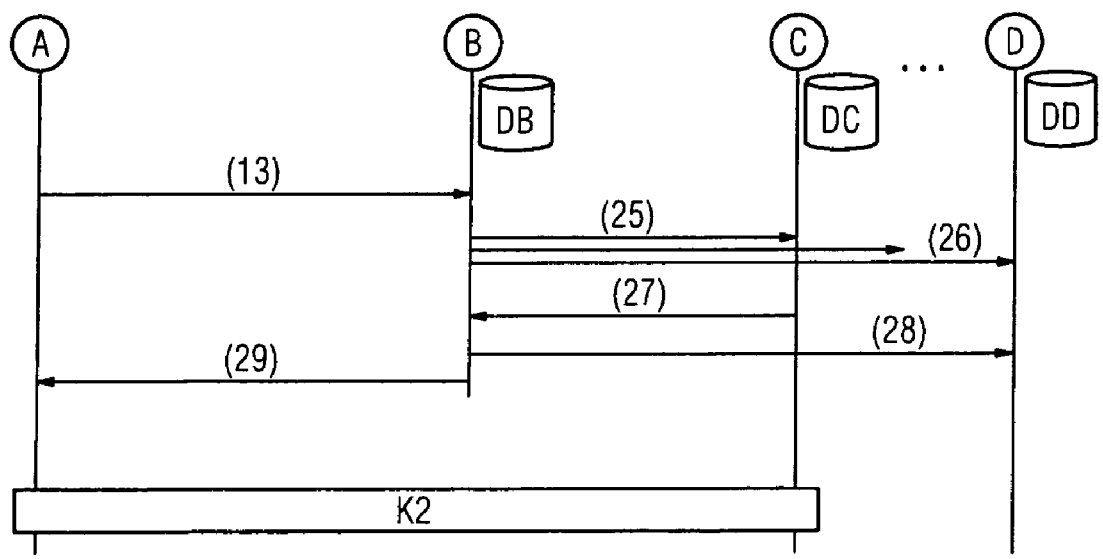
FIG. 2b shows the interchange of messages between clients for a call to a call transfer group.

FIGS. 2a and 2b are subsequently used to show the implementation of the known service feature "call transfer" or "call transfer group" in a directly communicating communication network, with FIG. 2a showing the configuration of a communication arrangement for implementing these service features, while FIG. 2b shows the connection setup to a member of a call transfer group.

FIG. 2a shows the clients B, C, D which are already described in the preceding descriptions of the figures. Generally, there are various options as to how clients in a communication network can be combined to form a group. By way of example, it is possible to use a (manual) administration operation to determine the members of a group and to notify each of the clients which are meant to be a member of this group of this group membership and of the information about the other members in the group. Another way is to notify each client in a communication network, by means of a definition, of which properties a client needs to have in order to be part of a particular group. Each client itself then decides whether it belongs to this group defined in this manner, and notifies all other clients in the communication network, for example by means of a "broadcast message", that it belongs to the group. In the present exemplary embodiment, clients B and D have already been combined to form a call transfer group. The text below describes how this call transfer group is extended by client C (step a).

Clients B, C, D each comprise a database DB, DC, DD which is used to store group information. In this example, the call transfer group is intended to be administered from the workstation of client B. For this reason, client B sends client C a configuration message 21 containing a group identification (group name) and a list with the names and address information of the group members to date. Client C now decides that it needs to belong to the call transfer group. Therefore, an appropriate data record recording the names and address information of the clients B, C, D belonging to the group is created in the database DC. Client C then sends a confirmation message 22 to client B, and the latter changes its associated database DB in line with the group extension. Client B now sends an information item 23 to each other client in the call transfer group (in this case client D) which has not yet been informed about the extension to the call transfer group. When this message 22 has been received, client D now also extends the entries for the call transfer group in its database DD and then sends an acknowledgement message 24 to client B.

Alternatively, the clients may also be programmed such that a new client C added to the group sends the information about its group membership itself to the as yet uninformed group members (clients B, D).

The text below uses FIG. 2b to describe how a call to a member of the call transfer group formed in the exemplary embodiment shown in FIG. 2a is made. Unlike in FIG. 2a, FIG. 2b also shows client A, which has already been introduced as part of the description of the figures relating to FIG. 1a. Client A sends a control message 13 to set up a communication link to client B. The call is immediately signaled on client B (client B "rings"); at the same time, client B establishes from the information in its database DB that the call needs to be signaled on the other members of the call transfer group, namely client C and client D. For this reason, client B sends clients C and D a respective signaling call ("multicast message") 25, 26, which contains firstly the name and the address information of client B as a "sender statement", and secondly the information that a call waiting on client B can be transferred by client A (step b). While the directly called client B has the status (call state) "busy" at the start of call signaling, clients C and D now signal the call waiting on client B by virtue of their continuing to be in the call state "free".

In the present exemplary embodiment, it is now client C which wishes to transfer the call waiting on client B. To this end, client C sends a call transfer message 27 to client B (step c). Client B now stops the call signaling, and client B also sends a message 28 to client D in order to stop signaling the call to client D. In addition, client B now sends a call diversion message 29, in which client A is now notified of the name and the address information of client C. As a result, the communication link K2 is now set up to client C by client A (step d).

As already described, as soon as it is called by client A, client B sends the messages 25 and 26 specifically to the other members of the call transfer group, namely to client C and client D. Alternatively, however, it is also possible for the called client B to send a "broadcast message", containing the information about the waiting call and the name of the call transfer group, to all other clients (including the ones not shown here) in the communication network. Each client which receives this "broadcast message" then uses the information held in the message to decide whether or not it belongs to this call transfer group and needs to signal this call waiting on client B for transfer.

In the exemplary embodiment described, it is possible that more than one of the clients signaling the call wishes to take the call (step c). In that case, a plurality of call transfer messages 27 ("call transfer request") arrive at the called client B. In this case, only the first incoming call transfer request is considered, while the other messages arriving subsequently ("late") are rejected or answered using a negative acknowledgement response.

The text below uses FIG. 3a to show the implementation of the service feature "group call" in a directly communicating communication network. The configuration of the group for the group call is effected in a similar manner to the configuration of the call transfer group, described with reference to FIG. 2a, and is therefore not explained further at this point (step a).

In the present example, it is assumed that a client A wishes to reach an arbitrary one of the other clients B, C. To this end, client A sends a call message 31 (step b), in the form of a broadcast message, which contains the name of the desired group, to all the clients which can be reached in the communication network. This call message 31 is received by clients B and C, so that both clients B, C change to the called state (that is to say are in the call state "busy") and respectively signal the waiting call from client A. The call is now accepted by one of the clients B, C (in this case by client B), with client B sending a call acceptance message 32 to client A (step C), and with this call acceptance message 32 naturally comprising the address information of client B. The communication link K3 between client A and client B is then set up (step d), and also client A sends a cancellation message 33, in the form of a "broadcast message", in which completion of the incoming call is confirmed by referring to the previously sent call signaling message 31, after which the call signaling is terminated in client C.

As an alternative to the procedure described above, client A may have a stored table listing all group members. In this case, the call signaling message 31 is not sent in the form of a "broadcast message" to all the clients in the communication network, but rather in the form of a "multicast message" just for the members of the group, that is to say to client B and client C (step b).

Another variant of the group call is a combination of the previously described method and the method explained with reference to FIG. 2b, in which client A sends just one call signaling message to one of the clients in the group, and this called client ensures that the call is signaled further to the other members of the group, in a similar manner to the case of the call transfer group (step b). In contrast to the call transfer group, however, this call is signaled to all the group members not as a call which is to be transferred, but rather as a "full" call, with each client called in this manner changing to the operating states "busy".

Another variant of the service feature "group call" is the "line group", in which the members of the group (of the line group) do not signal a waiting call simultaneously but rather in succession in a stipulated order. This case is shown in FIG. 3b.

Figure 3A:
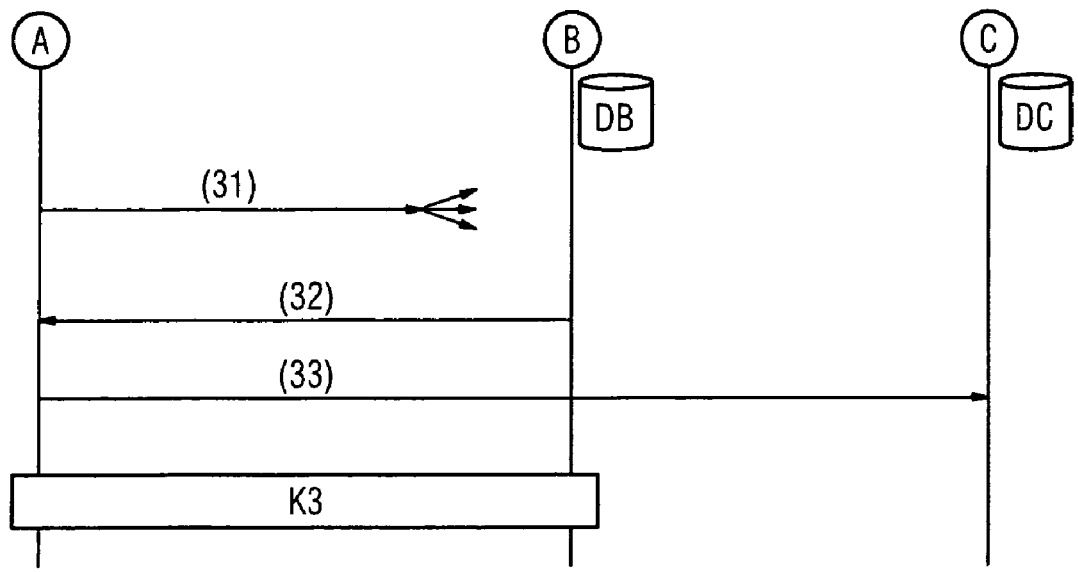
FIG. 3a shows the interchange of messages between clients for a group call.
Figure 3B:
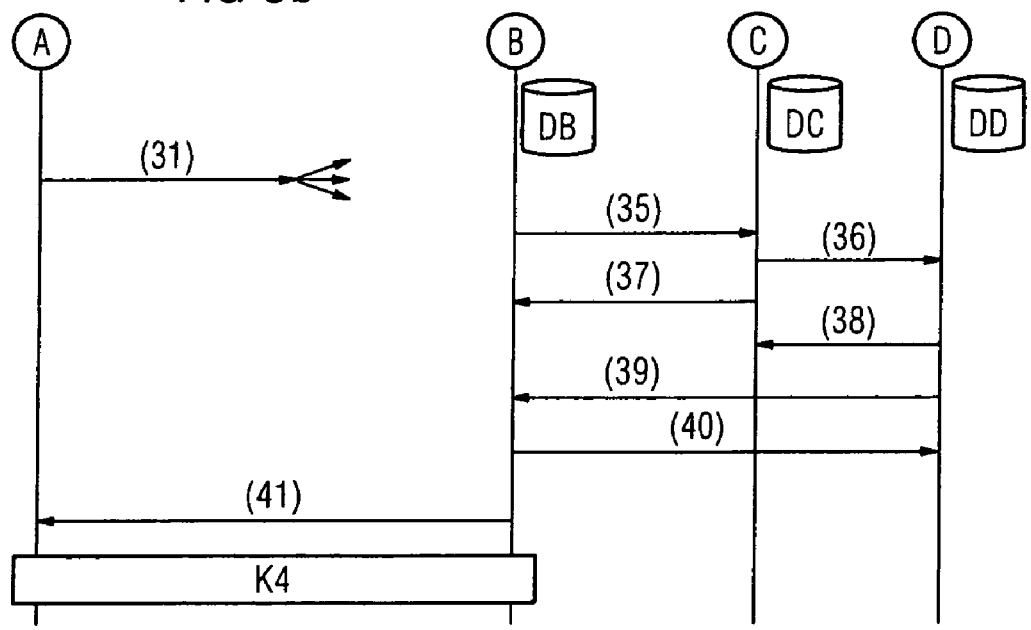
FIG. 3b shows the interchange of messages between clients for a group call in the variant of a cyclic line group.

In a similar manner to the method shown in FIG. 3a, client A sends a call signaling message 31 in the form of a "broadcast message" to all the clients B, C in the communication network (step b). The respective databases DB and DC in the clients B and C contain all the group information, with each group member being shown with a separate index in this table, and each group member having an associated period of time which indicates how long a call is to be signaled ("to wait") on this respective client.

The call signaling message 31 is now received by one of the group members, for example by client B. Client B now sends a synchronization message 35 to client C and thus informs client C about the waiting call. Client C acknowledges receipt of this message 35 using an acknowledgement message 37 on client B and, for its part, sends a synchronization message 36 to client D, which in turn sends an acknowledgement message 38 to client C. Client D, as the last group member, then sends a final synchronization message 39 to client B, which synchronization message is in turn acknowledged on client D by client B using an acknowledgement message 40. Each synchronization message sent contains a complete "history" of the previously informed clients. In addition, each received acknowledgement message is forwarded from the client which received this acknowledgement message to its "preceding" client. Furthermore, the clients are programmed such that if a client, for example, client C, is not available then this is registered by the preceding client (client B) after a waiting time has elapsed, and client B then sends a new synchronization message to the client with the next highest index descriptor, in this case client D. This ensures that even when clients have failed and are absent the synchronization cycle is completed and hence after the end of the synchronization cycle all the clients in the group contain the information about the available clients in the group, and it is thus definite which of the available clients has the lowest index number and therefore signals the call first. If this call signaled on the client with the lowest index number (in this exemplary embodiment client B) is not accepted, the client B called first sends an appropriate message to its successor client C (or in the case of one of the faults described to client D), and itself stops signaling the call. If the call is now accepted on one of the clients, for example on client D, then client D sends an appropriate message for call transfer to client B (step c) as in the exemplary embodiment shown in FIG. 2b, which results in the communication link K4 being set up (step d).

When the call is accepted, a message from client D, which has accepted the call, can be sent to the other members of the group so that the index numbers of the group members are changed in the database DB, DC, DD. This ensures that for the next incoming call the call is signaled first on another of the clients. This is important in call centers, for example, in order to achieve a uniform utilization level or load for the call center agents.

Figure 4:
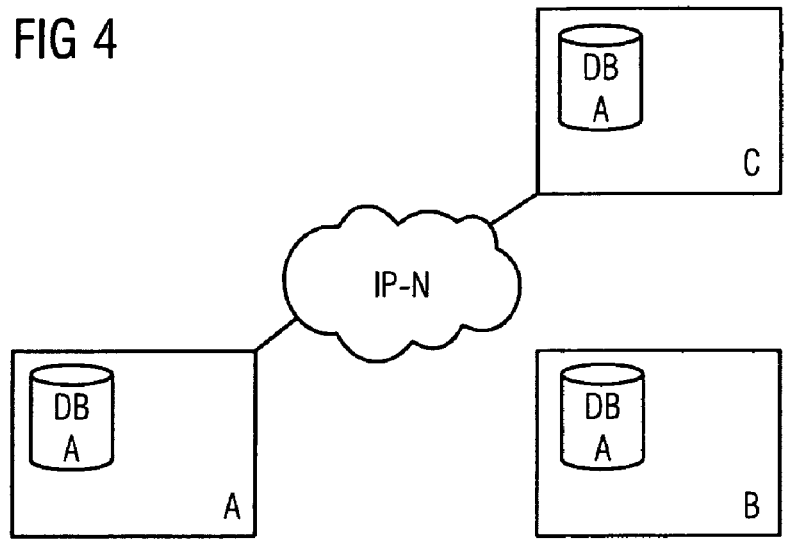
FIG. 4 shows an arrangement comprising clients in a directly communicating communication network, with a subscriber directory being created in one of the clients.

FIG. 4 shows an alternative illustration of clients A, B, C, with the directly communicating communication network IP-N used being a communication network which interchanges the data on the basis of the Internet protocol (IP network). Clients A, B, C store respective details about their own identity, that is to say their own name, user name, network address etc., and also details about their own functionality (e.g. usable voice codecs, video functionality, maximum bandwidth etc.) (step a). Clients A, B, C also have a respective address database DBA, DBB, DBC which can be used to store the names and address information of respective other clients and other information associated with these clients. These address databases are preferably used as an "electronic telephone book" for setting up communication links. To fill its address database DBA with information, particularly the address information for other clients, client A sends a "broadcast message", as a request message, to all the clients which can be reached in the communication network (step b). The request message contains the information that client A wishes to retrieve the address information of other clients. As a filter criterion, the request message also comprises the information that only information about clients which are in the form of a multimedia PC, that is to say have a functionality corresponding thereto, is required. The message is respectively received by client B and client C, which are both in the form of a multimedia PC, so that they send a respective response message to client A (step c). The response message respectively contains the client's own name and its own address information and also further information (name of the user, location etc.). These response messages are received and evaluated by client A, the information contained in the response messages being respectively added to the database BDA. At a later time, this information can be retrieved from the database BDA, with client A using the respective address information to set up a communication link to client B or to client C (step d).

Figure 5:
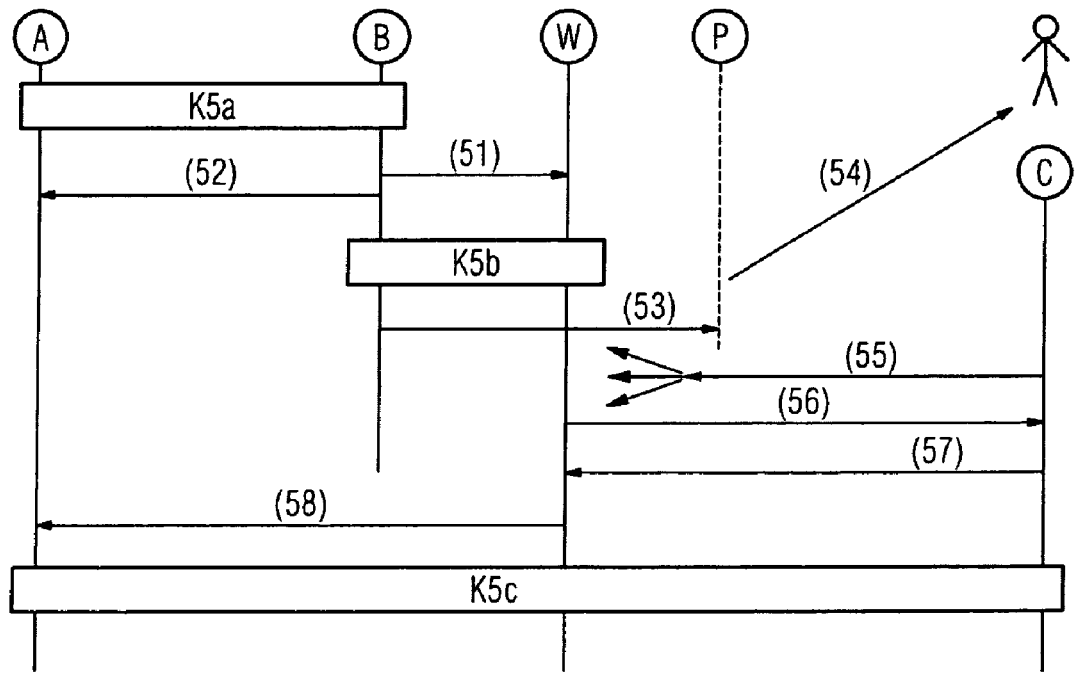
FIG. 5 shows the interchange of messages between clients for picking up a "parked" communication link.

The text below uses FIG. 5 to show the "parking" and resumption of a "parked" communication link. FIG. 5 shows a directly communicating communication network containing the clients A, B, C, which correspond to the clients A, B, C from the preceding exemplary embodiments and which are therefore not described again. In addition, a special client W is part of the communication arrangement, said client serving as a waiting destination and being able to receive communication links so that these communication links from a caller does not need to be broken, for example while a new contact is being sought.

Client A sets up a communication link K5a to a client B, client A being a customer, for example, which, as client B, is calling the telephone exchange in a company or department store. When the user of client B has received information about the desired contact from the caller (client A), client B sends a request message (51) to the client W used as waiting destination and in so doing requests the index number of a free park position. Client W sends client B the required park position number (e.g. "22") (step a); this park position number "22" is displayed on the display of client B. Client B now uses a message (52) to send client A the address information of client W, and asks client A from now on to continue the communication link K5a not with client B, but rather as a communication link K5b with client W. Subsequently, the communication link K5b between client A and client W has thus been set up, with client W sending client A waiting music or—in the case of multimedia clients—any desired multimedia contents for information and entertainment purposes. The user of client B now uses a message (53) to call the connection of a "paging installation" P in order to make an announcement (54) in the building (company; department store) which relates to the desired person and which comprises the park position number, that is to say for example "Herr Muller, 22 please". The person called in this way now goes to the next available client, client C, and activates a function on this client C in order to transfer parked communication links.

Since, in a larger communication network, a multiplicity of clients may be provided with position stores for waiting purposes, client C now sends a search message (55) (step b), in the form of a broadcast message, which contains the park position number 22 previously input by the sought person, to all the clients in the communication network. While clients A and B cannot allocate a park position number "22", client W responds to the search query (55) with a response message (56) which comprises not only the confirmation but also the address information of client W (step c). In addition, client W uses a diversion message (58) to notify client A that the existing communication link now needs to be continued with client C as the communication partner, as a result of which the call (the communication link K5b) is forwarded such that the communication link K5c (the useful data channels) are from now on connected between client A and client C (step d).

Instead of the multimedia PCs described, the examples can also use less powerful terminals which are not set up to execute the steps described, for example sending "broadcast messages". Such terminals can have these steps executed by other clients, which execute the steps representatively as "proxies". In this case, particular methods and functions can also be executed by arranging specialized proxies in a network which are able to be found by the clients for use, for example using search messages.

The invention claimed is:

1. A method for setting up a communication link between a plurality of clients in a communication network, comprising: storing client address information in a distributed form for the plurality of clients; establishing a waiting communication link between a sought client and a waiting destination client; the waiting, destination client sending a waiting destination descriptor; transmitting a broadcast request message from a searching client; the waiting destination client sending a response message comprising a client address information to the searching client; and the waiting destination client sending signaling information configured for setting up the communication link between the searching client and the sought client.

2. The method according to claim 1 wherein the client address information is stored in at least one database.

3. The method according to claim 2, wherein the stored client address information describe clients in a call transfer group, wherein the broadcast message is transmitted to the call transfer group clients described in the stored client address information, and wherein the clients involved in the communication link are in a free operating state at a start of the sending of signaling information.

4. The method according to claim 1 wherein the signaling information is rejected or not answered within a time period by the sought client; and wherein the broadcasted message includes an identifier for the sought client, and wherein the client address information in the response message is for a call diversion client.

5. The method according to claim 1 wherein the signaling information is sent in a diversion message.

6. The method according to claim 5, wherein the response message is comprised of a client address information item.

7. The method according to claim 1 wherein the searching client belongs to a call transfer group, and the method further comprising transferring the waiting communication link to the searching client using the stored client address information that describes clients in the call transfer group.

8. The method according to claim 1 wherein the communication link is formed from transferring the waiting communication link to the searching client via the waiting destination client.

9. The method according to claim 8, wherein the sought client is a client in a call transfer group, wherein the client address information in the response message is for the sought client, and wherein the communication link is set up between the searching client and the sought client.

10. The method according to claim 1 wherein the stored client address information describe clients in a group.

11. The method according to claim 1 wherein the communication network is a directly communicating communication network.

12. The method according to claim 11, wherein the waiting destination descriptor is sent to the searching client.

13. The method according to claim 11, wherein the sending of signaling information is effected by the sending of the response message to the searching client.

14. The method according to claim 1 wherein the client address information in the response message is stored by the searching client in a database, and wherein the database is accessed to set up the communication link.

15. The method according to claim 1 wherein the broadcast message comprises at least one filter criterion for selecting particular clients, and wherein the waiting destination client meets the at least one filter criterion.

16. The method according to claim 1 wherein the broadcast message comprises at least on filter criterion for selecting particular clients, and wherein the waiting destination client has a property that meets the at least on filter criterion.

* * * * *